(12) United States Patent
Lee

(10) Patent No.: US 8,738,908 B2
(45) Date of Patent: May 27, 2014

(54) SYSTEM AND METHOD FOR WEB-BASED SECURITY AUTHENTICATION

(75) Inventor: Chang Lee, Allen, TX (US)

(73) Assignee: Softlayer Technologies, Inc., Dallas, TX (US)

( * ) Notice: Subject to any disclaimer, the term of this patent is extended or adjusted under 35 U.S.C. 154(b) by 170 days.

(21) Appl. No.: 13/104,535

(22) Filed: May 10, 2011

(65) Prior Publication Data

US 2012/0290838 A1    Nov. 15, 2012

(51) Int. Cl.
*H04L 9/32*    (2006.01)

(52) U.S. Cl.
USPC ............................................. 713/168; 380/28

(58) Field of Classification Search
USPC .................. 380/255–256, 259, 37, 42, 28; 455/410–411; 709/238, 246; 713/150–163, 168–184; 726/2–10, 726/16–21, 26–30
See application file for complete search history.

(56) References Cited

U.S. PATENT DOCUMENTS

| | | | | |
|---|---|---|---|---|
| 7,203,838 | B1 * | 4/2007 | Glazer et al. ................... | 713/176 |
| 7,631,191 | B2 * | 12/2009 | Glazer et al. ................... | 713/176 |
| 7,783,893 | B2 * | 8/2010 | Gorelik et al. ................. | 713/186 |
| 7,941,834 | B2 * | 5/2011 | Beck et al. ........................ | 726/6 |
| 8,156,333 | B2 * | 4/2012 | Schneider ..................... | 713/168 |
| 8,225,109 | B1 * | 7/2012 | Kalligudd ..................... | 713/193 |
| 8,307,433 | B2 * | 11/2012 | Yue et al. ........................ | 726/22 |
| 2002/0019947 | A1 * | 2/2002 | Umezawa et al. ............ | 713/202 |
| 2006/0020815 | A1 | 1/2006 | Varghese et al. | |
| 2007/0127722 | A1 * | 6/2007 | Lam et al. ..................... | 380/277 |
| 2008/0250481 | A1 | 10/2008 | Beck et al. | |
| 2008/0263361 | A1 | 10/2008 | Dutta et al. | |
| 2009/0150983 | A1 | 6/2009 | Saxena et al. | |
| 2009/0271854 | A1 | 10/2009 | Hazlehurst et al. | |
| 2009/0319782 | A1 | 12/2009 | Lee | |
| 2010/0014662 | A1 * | 1/2010 | Jutila ............................. | 380/44 |
| 2011/0055585 | A1 * | 3/2011 | Lee ............................... | 713/183 |
| 2011/0131415 | A1 * | 6/2011 | Schneider ..................... | 713/171 |
| 2011/0283110 | A1 * | 11/2011 | Dapkus et al. ................ | 713/182 |
| 2012/0011564 | A1 * | 1/2012 | Osborn et al. ..................... | 726/2 |
| 2012/0159168 | A1 * | 6/2012 | Castro et al. .................. | 713/168 |

OTHER PUBLICATIONS

VeriSign Identity Protection Authentication Service, http//www.verisign.com/static/IDENTITY_PROTECTION_OVERVIEW.pdf, Feb. 2011.
Int'l Search Report dated Mar. 13, 2013 in co-pending appln. No. PCT/US12/37353.

* cited by examiner

*Primary Examiner* — Amare F Tabor

(74) *Attorney, Agent, or Firm* — Schmeiser, Olsen & Watts, LLP; Arthur J. Samodovitz

(57) ABSTRACT

A security authentication method comprises establishing a user account associated with a login credential, generating an encryption salt, generating graphical key images of a plurality of sequences of values each beginning at a random point, generating encrypted key values by encrypting each value in the plurality of sequences using the generated encryption salt, incorporating the graphical key images and encrypted key values into a displayable input form, receiving user input including a plurality of encrypted key values, generating decrypted key values by decrypting the encrypted key values of the user input using the encryption salt, and verifying that the decrypted key values match the login credential.

20 Claims, 3 Drawing Sheets

SYSTEM AND METHOD FOR WEB-BASED SECURITY AUTHENTICATION

FIELD

The present disclosure relates to a system and method for web-based security authentication.

BACKGROUND

Security data such as usernames, passwords, and PINs are commonly required for a user to access a number of computing resources including websites, financial accounts, shopping accounts, and other protected data. A user may access the protected resource or data using a smartphone, a personal digital assistant, a tablet computer, a laptop, a desktop computer, a kiosk, an ATM terminal, a point-of-sale terminal, or other electronic devices.

The entry of login credentials such as username, password, and PIN data are vulnerable to at least three types of known attack techniques. A covert key logging software residing in the computing device is capable of capturing, recording and reporting keystrokes entered by the user. In scenarios where the user uses a web browser to access a web resource or for authentication, the data communicated between the user device and the web server is also vulnerable to man-in-the-middle attacks. Another form of attach, commonly called cross-site request forgery, can exploit a user's authenticated identity at a website and cause an unauthorized action. These and other security risks may expose the user's protected resources and data to unauthorized access. Accordingly, a need arises for a solution to greatly minimize or eliminate such unauthorized access to confidential and protected data and resources.

SUMMARY

A system and method have been envisioned for web-based security authentication.

A security authentication method comprises establishing a user account associated with a login credential, generating an encryption salt, generating graphical key images of a plurality of sequences of values each beginning at a random point, generating encrypted key values by encrypting each value in the plurality of sequences using the generated encryption salt, incorporating the graphical key images and encrypted key values into a displayable input form, receiving user input including a plurality of encrypted key values, generating decrypted key values by decrypting the encrypted key values of the user input using the encryption salt, and verifying that the decrypted key values match the login credential.

A security authentication method comprises establishing a user account associated with a login credential, generating an encryption salt, generating graphical key images of a plurality of sequences of values each beginning at a random point, generating encrypted key values by encrypting each value in the plurality of sequences using the generated encryption salt, incorporating the graphical key images and encrypted key values into a displayable input form, receiving user input from a user including a plurality of encrypted key values, generating decrypted key values by decrypting the encrypted key values of the user input using the encryption salt, and giving the user access to data associated with the user account in response to the decrypted key values matching the login credential.

A security authentication system comprises a security authentication server operable to: establish a user account associated with a login credential, generate an encryption salt, generate graphical key images of a plurality of sequences of values each beginning at a random point, and generate encrypted key values by encrypting each value in the plurality of sequences using the generated encryption salt. The system further comprises a server operable to: receive the graphical key images and encrypted key values from the security authentication server, and incorporate the graphical key images and encrypted key values into a displayable input form. The system further comprises an electronic device operable to: display the input form, receive user input from a user including a plurality of encrypted key values. The security authentication server further operable to: receive the user input from the server, generate decrypted key values by decrypting the encrypted key values of the user input using the encryption salt, verifying the decrypted key values with the login credential, and notifying the server of successful authentication.

A security authentication system comprises means for establishing a user account associated with a login credential, means for generating an encryption salt, means for generating graphical key images of a plurality of sequences of values each beginning at a random point, means for generating encrypted key values by encrypting each value in the plurality of sequences using the generated encryption salt, means for incorporating the graphical key images and encrypted key values into a displayable input form, means for receiving user input including a plurality of encrypted key values, means for generating decrypted key values by decrypting the encrypted key values of the user input using the encryption salt, and means for verifying that the decrypted key values match the login credential.

A security authentication method comprises transmitting a request for login into a user account to a web server, receiving an input form from the web server having graphical key images of a plurality of sequences of values and encrypted key values, displaying the input form in a rotary dial format, receiving user input entered using the input form, and transmitting encrypted key values representing the user input to the web server for authentication.

DETAILED DESCRIPTION

Figure 1:
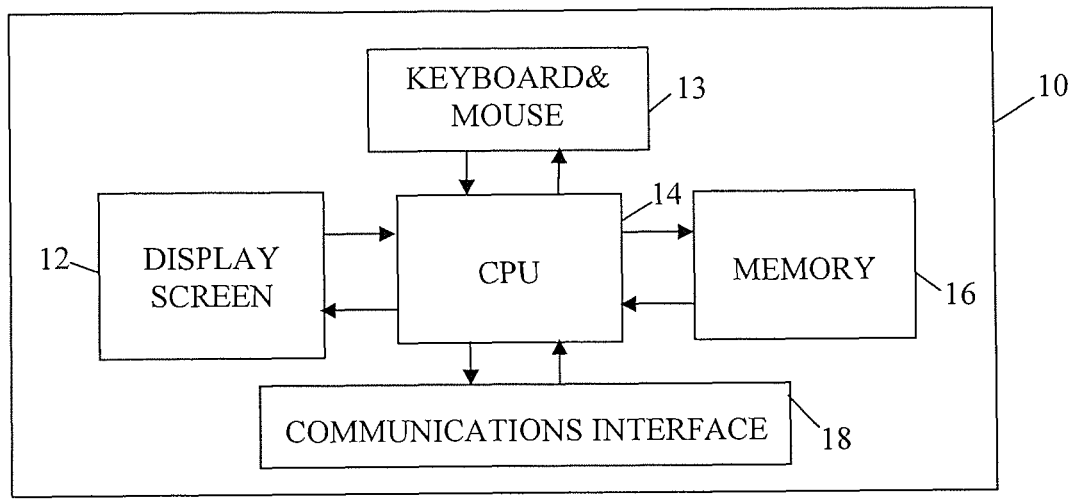
FIG. 1 is a simplified block diagram of an exemplary embodiment of an electronic computing device.

FIG. 1 is a simplified block diagram of an exemplary embodiment of an electronic computing device 10. The electronic device 10 may be any device or terminal, such as smartphone, a personal digital assistant, a tablet computer, a laptop, a desktop computer, a kiosks, an ATM terminal; a point-of-sale terminal, and other computing devices. The electronic device 10 includes user interfaces such as a display screen 12 for displaying information to the user, and a keyboard and a mouse 13. The keyboard includes a plurality of keys that enables the user to enter login data such as username, password, and PIN. The mouse is a conventional pointing device that enables the user to position a cursor anywhere on the screen 12 and click on selected text or graphics. Other pointing devices such as a touchpad, joystick, trackball, trackpad, and similar devices may be employed. The electronic device 10 further includes a CPU (central processing unit) 14 for executing software (i.e., program instructions) that performs processing, computing, decision, and communication functions. A memory 16 in the form of RAM (random access memory), ROM (read-only memory), hard drive, and/or any suitable computer readable data storage device is used to store information (i.e., software and data) needed for later retrieval and computation. The software is executed by one or more processors (e.g., CPU 14) via the one or more memories (e.g., RAM) and is stored on one or more computer readable data storage devices (e.g., hard drives). The term "computer readable storage device" does not mean signal propagation media such as copper transmission cables, optical transmission fibers and wireless transmission media. The term "computer program product" encompasses one or more computer-readable storage devices and software stored on the one or more storage devices. The electronic device 10 also includes a communication interface 18 that enables connections to the Internet, the World Wide Web, telecommunications networks, local area networks, wireless networks, and/or other suitable resources. The electronic device 10 may further include other peripheral devices as desired.

The electronic device 10 may require a security code such as a password or PIN to operate and/or access information, accounts, or other protected resources. For example, a smartphone, personal digital assistant, or laptop computer may require a password to unlock the device to enable use. As another example, the user must enter the correct login credential to access an online financial account, an online email account, a shopping website, a social media website, and a variety of other protected resources and data. In the system and method described below, the user's login credentials are verified by a remote security authentication server/service that avoids certain security risks such as key logging, man-in-the-middle, and cross-site request forgery attacks.

Figure 2:
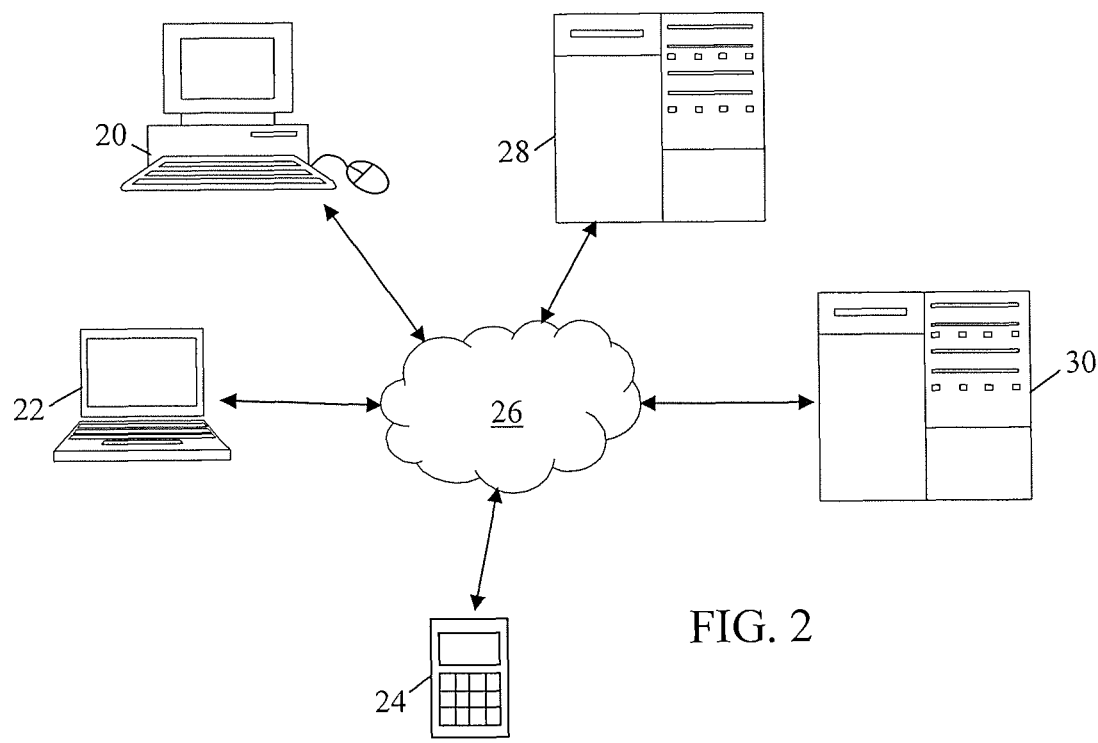
FIG. 2 is a simplified diagram of an exemplary web-based computing environment.

FIG. 2 is a simplified diagram of an exemplary web-based security authentication environment. Desktop computer 20, laptop computer 22, and smartphone 24 represent electronic devices that a user may use to access protected resources or data residing in a web server 28 via computer networks including the Internet and World Wide Web 26. As described above, other types of devices and terminals may also be used. A security authentication server 30 also connected to the Internet and World Wide Web is capable of authenticating the login credentials entered by the user at the electronic devices without exposing them to security risks such as key logging, man-in-the-middle, and cross-site request forgery attacks. The authentication server 30 may be one or more computing devices, virtual machines, or other computing entities including necessary operating systems, network drivers and configurations, and other software. Although not shown explicitly, the electronic devices may connect to the Internet and World Wide Web through other intermediate wired and wireless computer and telecommunications networks. In one embodiment, the desktop computer 20, laptop computer 22, web server 28, and authentication server 30 may each be configured in accordance with the electronic device 10 of FIG. 1, described supra.

Figure 3:
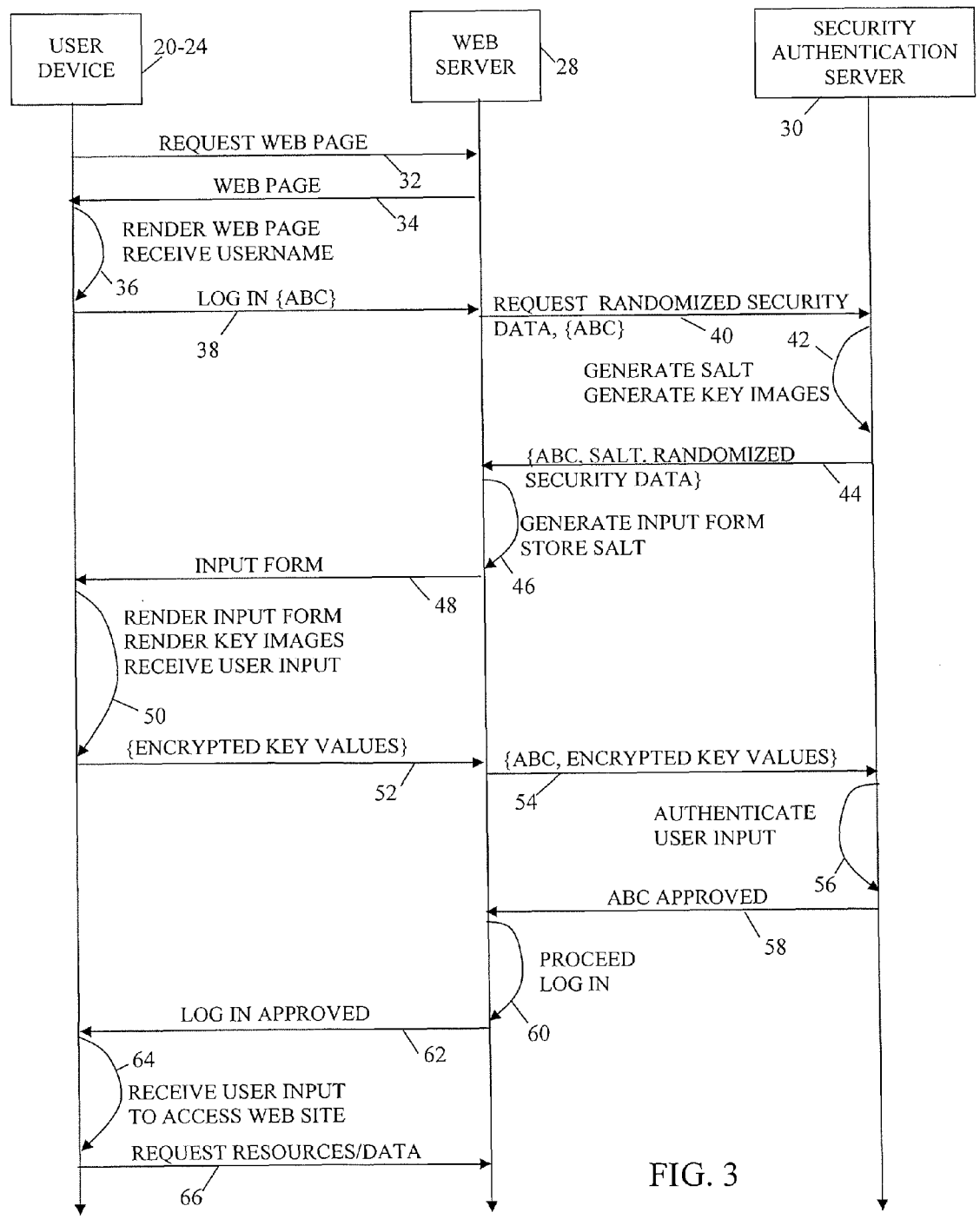
FIG. 3 is a data flow diagram of an exemplary embodiment of a method for web-based access authentication.

FIG. 3 is a data flow diagram of an exemplary embodiment of a method for web-based access authentication. This diagram provides a simplified representative data flow between the user device 20-24, the web server 28 having resources that the user desires access, and the security authentication server 30 that performs the login authentication functions. The user, using a web browser running on the electronic device, first requests a login web page from the web server 28, and the web server 28 transmits the login web page to the user's device, as shown in steps 32 and 34. The user's device then renders the login web page, which includes a text entry field for the user to enter login credentials such as a unique username, as shown in step 36. The user enters the username, represented in this example by "ABC," which is transmitted to the web server in step 38. The web server 28 then passes the username along with a request for randomized security data to the security authentication server 30, as shown in step 40.

Figure 4:
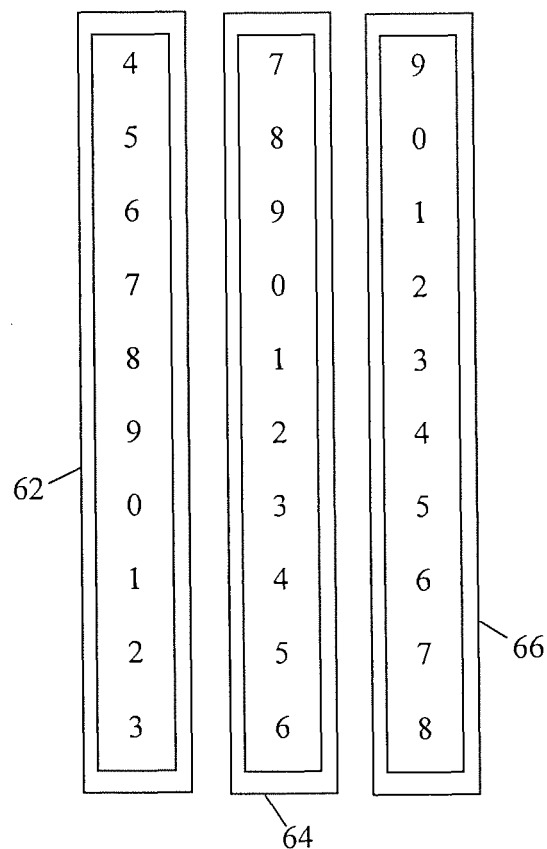
FIG. 4 is a diagram representation of key images for a three-digit security code according to an exemplary embodiment.

In response, the security authentication server 30 generates an encryption salt, which is a string of random bits of a predetermined length, and key images, as shown in step 42. The key images for a three-digit numerical PIN code example would be three independent series of numerals in sequence, each starting at a random point. For example as shown in FIG. 4, the key images of the first series 62 begins at 4 and ends at 3, the second series 64 begins at 7 and ends at 6, and the third series 66 begins at 9 and ends at 8. The security authentication server 30 further generates the corresponding encrypted value for each numeral in the key images using the generated encryption salt. For example, numeral 0 may correspond to "rTcee3rd," numeral 1 may correspond to "grru6erd," numeral 2 may correspond to "ur8etree," etc. In step 44, the username and the randomized security data that include the key images and encrypted values are transmitted to the web server 28. Preferably, only a location reference where the key images are stored and accessible is transmitted, such as a URL (Uniform Resource Locator).

In response, the web server 28 generates an input form using the key image URL and encrypted values, as shown in step 46. The input form may be in HTML (Hypertext Markup Language) and incorporates the key images. As described above, each of the numerals in the key images are encoded with a value that is generated with the encryption salt by the security authentication server 30. Therefore, clicking on any numeral by the user generates the corresponding encrypted value. For example, clicking on an image of "2" may generate the encrypted value, ur8etree; and clicking on an image of "3" may generate the encrypted value, rEr8rr3d. Accordingly, for a numerical PIN, each numeral has a corresponding encrypted value. The input form is then transmitted to the user's electronic device in step 48.

Figure 5:
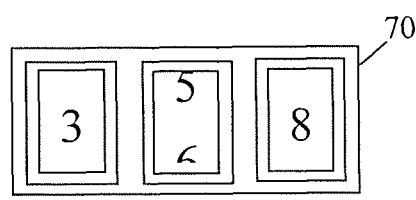
FIG. 5 is a diagram representation of a rotary dial representation of an input form of a plurality of sequences of values displayed by the electronic device.

In step 50, the electronic device renders the input form on the display screen that includes the key images, where the numerals are each associated with an encrypted value. An example is shown in FIG. 5 in which the key images may be displayed in the form of scrollable wheels or dials 70, where the user may scroll up and down along the sequences of numerals using the up and down arrows or mouse scroll wheel, for example. The user may enter the security code or PIN by clicking on the appropriate numeral key images in the input form. Once a digit of the PIN is selected, the numerals in that sequence are obfuscated so that the selected numeral is not displayed. Scrolling would cause the obfuscated numerals to again be displayed. Once the user selects all three digits of the PIN code, the user may submit the input form. This causes the user's encrypted PIN input to be transmitted to the web server 28, as shown in step 52.

The web server 28 in turn transmits the encrypted user input along with the username to the security authentication server 30, as shown in step 54. The security authentication server 30 determines whether the corresponding values of the encrypted user input are the correct PIN values for that particular user, and authenticates the login credentials, as shown in step 56. If the received encrypted values do not correctly correspond to the user's security code or PIN stored at the security authentication server 30, then authentication fails, and the user's access is denied. The security authentication server 30 further deletes or otherwise renders unusable the key images and encryption salt used in this session. The authentication approval or denial is then conveyed to the web server 28 in step 58. If the user's credentials are approved, the user may proceed in the login process, as shown in step 60. The approval or denial is in turn conveyed to the user's electronic device in step 62. If approval, the user gains access to the website or other protected resources and data, as shown in steps 64 and 66. However, if access is denied, the user is barred from obtaining the protected data and accessing the resources.

The user may have a predetermined number of tries to enter the correct login credentials. Each time the user requests access to protected resources or data, new key images, the encryption salt, and encrypted values are generated and used for that session.

An API (application program interface) executing on the security authentication server 30 may be used to perform the functions of communicating with the web server 28, receiving requests for key images, transmitting the requested key images to the web server, and validating the encrypted login credentials. An API conforming to the REST (Representational State Transfer) constraints (RESTful) or another suitable architecture may be used. The key images transmitted from the API to the web server 28 may be in the JSON (JavaScript Object Notation) format or another suitable format. An HTML widget executing on the user's electronic device may be used to "add" the security code input form to the HTML web page that is displayed to request entry of the login credential.

Although the method and data flow described above provide that certain functions or steps are carried out at a particular situs or in a particular manner, the system and method are not so limited. For example, the security authentication server 30 may additionally generate the input form and provide a location reference thereto to the electronic device. The widget in the electronic device is then operable to display the input form with the graphical key images by referencing the location reference. Further, the web server 28 and the security authentication server 30 may be separate servers as shown in FIGS. 2 and 3, or may be an integrated server if desired.

The features of the present invention which are believed to be novel are set forth below with particularity in the appended claims. However, modifications, variations, and changes to the exemplary embodiments described above will be apparent to those skilled in the art, and the system and method described herein thus encompass such modifications, variations, and changes and are not limited to the specific embodiments described herein.

What is claimed is:

1. A method for performing a security authentication, the method comprising:
    receiving, by a computing device, a username of a user along with a request for randomized security data in conjunction with a request by the user to access a resource, and in response, generating, by the computing device, N sequences, each sequence including a same M unique digits, each sequence beginning with a different digit of the M digits, the digits in each sequence being sequenced in a same order as the digits in each other sequence subject to the first digit in each sequence being considered as sequentially after the last digit in each sequence, N being at least 2, M being at least 3;
    generating, by the computing device, an encrypted value specific to each of the digits in the N sequences;
    transmitting, by the computing device, the username, the N sequences, and the generated encrypted values to a destination device that permits the user to select a digit from each of the N sequences;
    after the transmitting, receiving, by the computing device from the destination device, N encrypted values of the transmitted encrypted values, wherein an received encrypted value of the N received encrypted values is specific to one of the digits selected by the user, at an electronic device, from a respective $I^{th}$ sequence of the N sequences (I=1, 2, . . . , N); and
    determining, by the computing device, N digits respectively specific to the received N encrypted values and that the determined N digits form a number matching a PIN associated with the username, which authenticates the user to access the resource.

2. The method of claim 1, wherein in further response to the receiving the username along with the request for randomized security data, generating, by the computing device, a string of random bits of a predetermined length, and wherein the generating the encrypted value comprises generating the encrypted value in association with each unique digit in the N sequences using the string of random bits.

3. The method of claim 1, wherein the generating the encrypted value specific to each of the digits in the N sequence results in only M encrypted values being generated for the N sequences collectively.

4. The method of claim 1, further comprising:
    randomly selecting, by the computing device, a digit of the digits in each sequence to denote where each sequence begins, which results in each sequence beginning with the different digit.

5. The method of claim 1, wherein the transmitting the username, the N sequences, and the generated encrypted values further comprises transmitting to the destination device a location reference denoting where the N sequences are stored.

6. The method of claim 1, wherein the computing device, the destination device, and the electronic device are distinct devices connected to and separated from one another by a network.

7. The method of claim 1, further comprising:
    providing, by the destination device, the user with access to the resource in response to the determining that the N digits form the number matching the PIN.

8. The method of claim 1, further comprising:
    sending, by the destination device to the electronic device, a web page that includes an entry for the user to enter the username.

9. The method of claim 1, further comprising:
    incorporating, by the destination device, the N sequences and the generated encrypted values into an input form, wherein the input form is configured to be displayed to the user for receiving from the user an identification of the digits selected by the user from each of the N sequences.

10. The method of claim 9, wherein the input form is configured to have the N sequences displayed in a rotary dial graphical representation.

11. A computer program product for performing a security authentication, the computer program product comprising one or more computer-readable storage devices and program instructions stored on the one or more storage devices, wherein the program instructions comprise:

program instructions to receive, by a computing device, a username of the user along with a request for randomized security data in conjunction with a request by the user to access a resource, and in response, generate N sequences, each sequence including a same M unique digits, each sequence beginning with a different digit of the M digits, the digits in each sequence being sequenced in a same order as the digits in each other sequence subject to the first digit in each sequence being considered as sequentially after the last digit in each sequence, N being at least 2, M being at least 3;

program instructions to generate an encrypted value specific to each of the digits in the N sequences;

program instructions to transmit the username, the N sequences, and the generated encrypted values to a destination device that permits the user to select a digit from each of the N sequences;

program instructions to receive, by the computing device from the destination device after the N sequences and the encrypted values have been transmitted to a destination device, N encrypted values of the transmitted encrypted values, wherein an $I^{th}$ received encrypted value of the N received encrypted values is specific to one of the digits selected by the user, at an electronic device, from a respective $I^{th}$ sequence of the N sequences (I=1, 2, . . . , N); and program instructions to determine, by the computing device, N digits respectively specific to the received N encrypted values and that the N digits form a number matching a PIN associated with the username, which authenticates the user to access the resource.

12. The computer program product of claim 11, wherein the program instructions further comprise:

program instructions to, in further response to the receiving the username along with the request for randomized security data, generate, by the computing device, a string of random bits of a predetermined length, wherein the program instructions to generate the encrypted value comprises program instructions to generate the encrypted value in association with each unique digit in the N sequences using the string of random bits.

13. The computer program product of claim 11, wherein the program instructions to generate the encrypted value specific to each of the digits in the N sequence results in only M encrypted values being generated for the N sequences collectively.

14. The computer program product of claim 11, wherein the program instructions further comprise:

program instructions to randomly select, by the computing device, a digit of the digits in each sequence to denote where each sequence begins, which results in each sequence beginning with the different digit.

15. The computer program product of claim 11, wherein the program instructions to transmit the username, the N sequences, and the generated encrypted values further comprises program instructions to transmit to the destination device a location reference denoting where the N sequences are stored.

16. A computer system for performing a security authentication, the system comprising one or more processors, one or more computer-readable memories, one or more computer-readable storage devices, and program instructions stored on the one or more storage devices for execution by the one or more processors via the one or more memories, wherein the program instructions comprise:

program instructions to receive, by a computing device, a username of a user along with a request for randomized security data in conjunction with a request by the user to access a resource, and in response, generate N sequences, each sequence including a same M unique digits, each sequence beginning with a different digit of the M digits, the digits in each sequence being sequenced in a same order as the digits in each other sequence subject to the first digit in each sequence being considered as sequentially after the last digit in each sequence, N being at least 2, M being at least 3;

program instructions to generate an encrypted value specific to each of the digits in the N sequences;

program instructions to transmit the username, the N sequences, and the generated encrypted values to a destination device that permits the user to select a digit from each of the N sequences;

program instructions to receive, by the computing device from the destination device after the N sequences and the encrypted values have been transmitted to a destination device, N encrypted values of the transmitted encrypted values, wherein an $I^{th}$ received encrypted value of the N received encrypted values is specific to one of the digits selected by the user, at an electronic device, from a respective $I^{th}$ sequence of the N sequences (I=1, 2, . . . , N); and program instructions to determine, by the computing device, N digits respectively specific to the received N encrypted values and that the N digits form a number matching a PIN associated with the username, which authenticates the user to access the resource.

17. The computer system of claim 16, wherein the program instructions further comprise:

program instructions to, in further response to the receiving the username along with the request for randomized security data, generate, by the computing device, a string of random bits of a predetermined length, wherein the program instructions to generate the encrypted value comprises program instructions to generate the encrypted value in association with each unique digit in the N sequences using the string of random bits.

18. The computer system of claim 16, wherein the program instructions to generate the encrypted value specific to each of the digits in the N sequence results in only M encrypted values being generated for the N sequences collectively.

19. The computer system of claim 16, wherein the program instructions further comprise:

program instructions to randomly select, by the computing device, a digit of the digits in each sequence to denote where each sequence begins, which results in each sequence beginning with the different digit.

20. The computer system of claim 16, wherein the program instructions to transmit the username, the N sequences, and the generated encrypted values further comprises program instructions to transmit to the destination device a location reference denoting where the N sequences are stored.

* * * * *